Dec. 28, 1943.  D. PAUL  2,337,767
GUARD FOR WELDING TOOLS
Filed Sept. 26, 1942
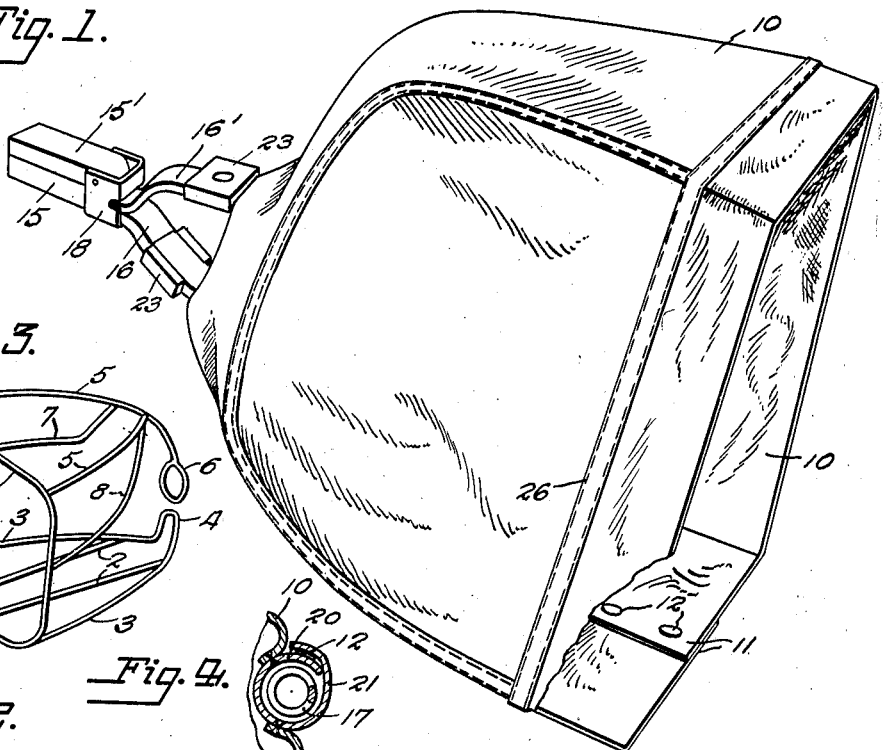
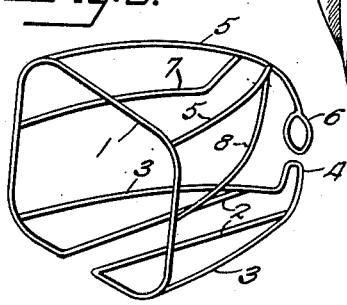
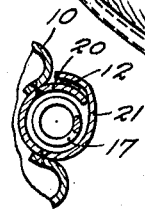
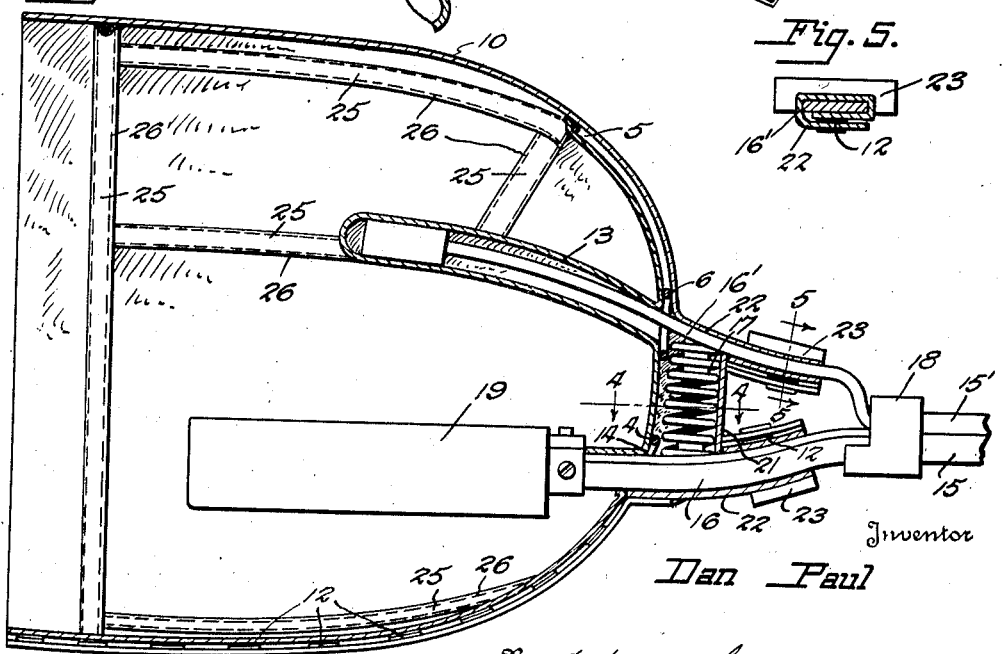
Inventor
Dan Paul Patented Dec. 28, 1943

2,337,767

UNITED STATES PATENT OFFICE 2,337,767

GUARD FOR WELDING TOOLS

Dan Paul, Port Arthur, Tex.

Application September 26, 1942, Serial No. 459,859

3 Claims. (Cl. 2—17)

This invention relates to guards and more particularly to guards for protecting the hand and wrist of the welder from sparks and the heat incident to the electric welding operation.

The usual electric welding tool is a tong-like device having pivoted lever members, the opposite ends of which provide gripper members adapted to grip a rod of the welding metal while the opposite arms operate as handle levers. To guard the hand of the mechanic which engages these handle levers it is essential that his freedom of movement is not impeded and that the tool be freely manipulated so as to enter restricted spaces commonly encountered in welding work.

The object of the invention is to provide an improved and simplified guard easily applied to a welding tool of the character indicated which will adequately protect the hand of the operator from heat and spark and at the same time not interfere and impede the efficient use of the tool.

The invention consists in the novel construction, arrangement and combinations of parts hereinafter more particularly described and claimed.

One sheet of drawings accompanies this specification as part thereof in which like reference characters indicate like parts throughout:

Figure 1 is a perspective view of the improved guard as applied to a welding tool;

Figure 2 is a longitudinal transverse cross section of the improved guard applied to a welding tool;

Figure 3 is a perspective view of the wire frame forming the skeleton of the guard device;

Figure 4 is a fragmentary cross sectional view taken on line 4—4 of Figure 2; and Figure 5 is a fragmentary cross section taken on line 5—5 of Figure 2.

In accordance with the present invention the guard device comprises a skeleton frame preferably formed from spring wire bent as illustrated in Figure 3 to form a substantially rectangular rear member 1, the end portions of this piece of wire being bent to form arms 2—2 spaced from each other and extending substantially perpendicular to the plane of the portion 1. On the same side of the portion 1 with the spaced arms 2—2 a further piece of wire bent to form arms 3—3 with an intermediate loop portion 4 is secured and to these arms 3—3 are secured by welding or otherwise the ends of the arms 2—2. On the opposite side of the rectangular frame member 1 is secured a further wire 5 having its free end formed into a loop 6 positioned adjacent to the loop 4 and the wire 5 is stiffened by supporting wires 7 and 8 which are in turn anchored to the rectangular frame member 1.

By the structure thus described it will be noted that the frame member as a whole is capable of being resiliently flexed by reason of the spaced relationship of the members 2—2 so that the size of the frame member will be modified depending upon the external pressure applied to it so that the frame member can adjust itself to restricted spaces within which it is desired to work.

The frame or skeleton member has secured thereon a cover 10 of flexible heat-resisting material such as leather which may, if desired, be supplemented with asbestos or other heat-resistant sheet material and this cover is preferably formed with snap fasteners 12. A finger 13 is secured within and to the cover by its free end which is arranged to surround the loop 6 of the frame while the forward end of the cover is provided with a plurality of flaps each provided with snap fasteners 12, these flaps being arranged to embrace and secure the welding tool in the following manner.

The ordinary welding tool is formed with opposed gripper members 15—15' which are pivotally associated as by a loop member 18 and which are carried by handle members 16—16'. The handle members 16—16' are forced apart by a strong coil compression spring 17 interposed between them so that the gripper members are normally forced together to engage a rod of welding metal (not shown). The handle lever 16 carries on its inner end a handle grip 19 of electrical resistance material by which the tool is held and manipulated by the operator.

As applied to the improved guard the handle 19 of the welding tool is inserted through an orifice 14 in the cover 10 which is coincident with the loop 4 of the skeleton framework and in alignment, preferably, with the fastener secured edges of the cover. The handle 16' of the welding tool is inserted through the loop 6 of the frame member into the finger 13 of the cover. Portions 20—21 of a flap secured to the forward end of the cover extend around and completely enclose the compression spring 17 of the welding tool (see Figure 4) while additional flaps 22 are provided, each of which carries an electric and heat-resisting element 23 which may be formed of fiber or the like, and which is shaped to embrace the exposed portions of the handle levers 16—16' to prevent short circuiting of the tool when working in constricted spaces, these members being positioned by the overlapped ends of the flaps and snap fasteners 12. (See Figure 5.)

In practice the flaps above referred to are made from scraps of irregular shape and their contour offers no suggestion of their utility. In other cases these flaps may be formed from irregular portions of the main body 10 at the forward end thereof. In either case the only essential requisite of these flaps is that they extend from the forward end of the cover 10 and are of sufficient size to permit the location of the co-acting members of the snap fasteners 12 so that portions of these flaps can be secured around the spring 17 as illustrated in Figure 4 or around the handle members 16 and 16' of the welding tool as illustrated in Figure 5.

The cover 10 is positioned over the frame skeleton and held in position by trips 25 which extend over the various frame members and are secured to the cover by stitching 26.

From the foregoing description it will be noted that this guard applied as described to the welding tool the operator's hand will be positioned within the frame and cover in engagement with the handle lever 16 and the finger 13 surrounding lever 16' so that the tool can be effectively manipulated while the collapsible framework will permit the operator adequate freedom in the welding operation.

Various modifications and details of construction will readily suggest themselves to those skilled in the art, but within the scope of the invention as claimed.

What I claim is:

1. A guard for use with electric welding tools comprising a skeleton frame of wire formed in the general shape of a gauntlet with portions at the forward end to receive the handles of the tool and with opposed sides resiliently associated and a cover of flexible heat-resisting material secured on said frame, said cover formed with flaps at the forward end having fastening devices said flaps arranged to embrace portions of and to pivotally secure a welding tool in said guard.

2. A guard for use with electric welding tools comprising a skeleton frame of spring wire formed in the general shape of a gauntlet with portions at the forward end to receive the handles of the tool and capable of being flexed in response to external pressure and a cover of flexible heat-resisting material secured on said frame, said cover formed at its forward end with an inwardly directed finger and flaps to embrace and pivotally support a welding tool with portions thereof within and without the device respectively.

3. A device as specified in claim 1 with electrical and heat-resisting elements carried by flaps of the cover arranged to embrace portions of the welding tool exteriorly of the guard.

DAN PAUL.